US011193586B2

(12) United States Patent
Berger et al.

(10) Patent No.: US 11,193,586 B2
(45) Date of Patent: Dec. 7, 2021

(54) PARKING LOCK AND A TRANSMISSION HAVING THE PARKING LOCK

(71) Applicant: Mahle International GmbH, Stuttgart (DE)

(72) Inventors: Martin Berger, Remlingen (DE); Karl-Heinz Hanslik, Stuttgart (DE); Hermann Hoffmann, Filderstadt (DE); Florian Kollitz, Althutte (DE)

(73) Assignee: Mahle International GmbH

(*) Notice: Subject to any disclaimer, the term of this patent is extended or adjusted under 35 U.S.C. 154(b) by 92 days.

(21) Appl. No.: 16/696,768

(22) Filed: Nov. 26, 2019

(65) Prior Publication Data

US 2020/0166131 A1 May 28, 2020

(30) Foreign Application Priority Data

Nov. 28, 2018 (DE) .......................... 102018220503.5

(51) Int. Cl.
*F16H 63/34* (2006.01)
*B60T 1/00* (2006.01)
*F16H 63/30* (2006.01)

(52) U.S. Cl.
CPC .......... *F16H 63/3425* (2013.01); *B60T 1/005* (2013.01); *F16H 63/304* (2013.01);
(Continued)

(58) Field of Classification Search
CPC .... F16D 21/06; F16H 63/3425; F16H 63/304; F16H 63/3466; F16H 63/3483; F16H 2063/3056
See application file for complete search history.

(56) References Cited

U.S. PATENT DOCUMENTS 6,725,737 B2  4/2004 Baasch et al.
2001/0045337 A1  11/2001 Ono
(Continued)

FOREIGN PATENT DOCUMENTS

DE       10051373 A1    4/2002
DE    102012012673 A1   12/2013
(Continued)

OTHER PUBLICATIONS

English abstract for DE-102012012673.
English abstract for DE-102015206157.
English abstract for JP-S58-110343.

*Primary Examiner* — Stacey A Fluhart
(74) *Attorney, Agent, or Firm* — Fishman Stewart PLLC

(57) ABSTRACT

A parking lock for a transmission of a motor vehicle may include a park gear rotatable about an axis of rotation, and an actuation device adjustable into a locking position and an unlocking position radially relative to the axis of rotation. In the unlocking position, rotating of the park gear may be possible, and in the locking position, rotating of the park gear may be prevented by way of positive locking. The actuation device may include a shifting drum and a locking lever, wherein the shifting drum may be rotatable about a guiding axis that is radial relative to the axis of rotation. The locking lever, by way of a guide track formed in the shifting drum, may interact with the guide track so that when the shifting drum is rotated, the locking lever may be guidable by the guide track radially relative to the axis of rotation and parallel to the guiding axis, and thereby the actuation device may be adjustable into the locking position and into the unlocking position.

19 Claims, 3 Drawing Sheets

(52) U.S. Cl.
CPC ..... *F16H 63/3408* (2013.01); *F16H 63/3466* (2013.01); *F16H 63/3483* (2013.01); *F16H 2063/3056* (2013.01)

(56) References Cited

U.S. PATENT DOCUMENTS

| | | | | |
|---|---|---|---|---|
| 2004/0093969 | A1* | 5/2004 | Nielsen | H02K 7/06 |
| | | | | 74/89.23 |
| 2010/0108460 | A1* | 5/2010 | Nakamura | F16H 63/3416 |
| | | | | 192/219.5 |
| 2019/0353246 | A1* | 11/2019 | Kisielewicz | F16H 63/3416 |
| 2020/0189549 | A1* | 6/2020 | Mazzarini | F16D 51/22 |

FOREIGN PATENT DOCUMENTS

| | | |
|---|---|---|
| DE | 102015206157 A1 | 10/2016 |
| JP | S58-110343 A | 6/1983 |

\* cited by examiner

PARKING LOCK AND A TRANSMISSION HAVING THE PARKING LOCK

CROSS-REFERENCE TO RELATED APPLICATIONS

This application claims priority to German Patent Application No. DE 10 2018 220 503.5, filed on Nov. 28, 2018, the contents of which are hereby incorporated by reference in their entirety.

TECHNICAL FIELD

The invention relates to a parking lock for a transmission of a motor vehicle. The invention also relates to a transmission having the parking lock.

BACKGROUND

Parking locks are already known from the prior art and are used for blocking a transmission in a parking position. There, a gear wheel of the transmission is usually operatively connected with a park gear, which in turn is connected to an actuation unit via a locking pawl. In a parking position, the actuation unit is actuated and the park gear is positively prevented in its rotation by the locking pawl engaging in the park gear. Accordingly, the gear wheel of the transmission that is operatively connected with the park gear and thereby the transmission itself are blocked. In a driving position, the positive-locking connection between the park gear and the locking pawl can be released and because of this the park gear, the gear wheel of the transmission and the transmission itself can be released.

Basically, a reducing of the mechanical forces, a simplified assembly and a simplified overall structure are the endeavour of further developments of parking locks.

SUMMARY

The object of the invention is to state for a parking lock of the generic type and a transmission having the parking lock an improved or at least alternative embodiment which can be in particular assembled more easily.

According to the invention, this object is solved through the subject of the independent claims. Advantageous embodiments are subject of the dependent claims.

A generic parking lock is provided for a transmission of a motor vehicle and comprises a park gear that is rotatable about an axis of rotation and an actuation device. Here, the actuation device is adjustable into a locking position and an unlocking position radially relative to the axis of rotation of the park gear, wherein in the unlocking position of the actuation device a rotating of the park gear is possible and in the locking position of the actuation device, a rotating of the park gear is positively prevented. According to the invention, the actuation device comprises a shifting drum and a guide unit, wherein the shifting drum is rotatable about a guiding axis radially relative to the axis of rotation of the park gear. Furthermore, the guide unit interacts with the shifting drum by way of a guide track formed in the said shifting drum. When the shifting drum is rotated, the guide unit is guidable by the guide track radially to the axis of rotation of the park gear and parallel to the guiding axis and because of this the actuation device or a gripping element of the same, is adjustable into the locking position and into the unlocking position.

In the actuation device, a rotary movement of the shifting drum is converted into a linear movement of the guide unit, as a result of which the actuation device is adjustable radially relative to the axis of rotation of the park gear and parallel to the guiding axis of the shifting drum into a locking position and into the unlocking position. To this end, the guide unit can comprise for example at least one integrally formed guide element which engages in the guide track radially relative to the shifting drum. When the shifting drum is rotated, the guide element can be adjusted by the guide track axially relative to the guiding axis and the guide unit in this way guided parallel to the guiding axis and radially relative to the axis of rotation of the park gear. By adjusting the guide unit, the actuation device can be brought into the locking position and into the unlocking position. In the unlocking position of the actuation device, a rotating of the park gear is possible and in the locking position of the actuation device a rotating of the park gear is positively prevented. The park gear can be operatively connected with a gear wheel of the transmission so that when the park gear is locked in the locking position of the actuation device, the transmission of the motor vehicle is also locked. Advantageously, the mechanical forces and friction can be advantageously reduced in the parking lock according to the invention.

In an advantageous further development of the parking lock according to the invention, it is provided that the guide unit directly interacts with the park gear. In the locking position, the actuation device engages in teeth of the park gear radially relative to the axis of rotation of the park gear in a positively joined manner and in the unlocking position, the actuation device does not engage in the teeth of the park gear. In particular, a conventionally necessary locking pawl is not required here, so that the number of the components in the parking lock can be reduced and the overall construction of the parking lock simplified. Here, the guide unit can comprise an integrally formed gripping piece which can engage in the teeth of the park gear in a positive or locking manner. During the adjusting of the actuation device into the locking position, the gripping piece can then be moved radially relative to the axis of rotation of the park gear towards the same and engage in the teeth of the park gear. Through the engagement of the gripping piece in the teeth of the park gear, the park gear can be blocked. In the unlocking position, the engagement of the gripping piece in the teeth of the park gear can be correspondingly disengaged.

In an advantageous alternative further development of the parking gear according to the invention it is provided that the guide unit indirectly interacts with the park gear via a locking lever of the parking lock. The locking lever is pivotable by the guide unit of the actuation device about a pivot axis that is parallel to the axis of rotation of the park gear. In the locking position of the actuation device, the locking lever positively engages in teeth of the park gear radially relative to the axis of rotation of the park gear. In the unlocking position of the actuation device, the locking lever does not engage in the teeth of the park gear. The locking lever thereby converts the linear movement of the guide unit of the actuation device into a pivot movement about the pivot axis. For engaging in the teeth of the park gear, the locking lever can for example comprise a gripping tooth, which is integrally formed on the locking lever. When the actuation device is adjusted into the locking position, the locking lever of the actuation device can move radially relative to the axis of rotation of the park gear towards the same and thereby pivot the locking lever about the pivot axis towards the park gear. Because of this, the locking lever can engage in the teeth of the park gear and prevent its rotation. Accordingly, a rotation of a gear wheel of the transmission that is operatively connected with the park gear can thereby be locked in the park position.

In addition it can be provided that the locking lever comprises a basic body that is guidable on the guide track and a gripping element. Here, the gripping element interacts with the locking lever and is resiliently adjustable translationally by a spring device radially relative to the axis of rotation to the basic body of the park gear. Here, the gripping element can be arranged in the basic body at least in regions and be guidingly mounted in the basic body between two spaced-apart stop faces radially relative to the axis of rotation of the park gear and parallel to the guiding axis. By way of the spring device, the gripping element can be resiliently connected to the basic body radially to the axis of rotation of the park gear and parallel to the guiding axis. The spring device can be for example a coil spring which is arranged about a cylindrical gripping element.

Alternatively or additionally it can be provided that the locking lever comprises a spring return arrangement which acts radially to the axis of rotation of the park gear against the locking lever of the actuation device. In the unlocking position of the actuation device, the spring return arrangement pushes the locking lever away from the park gear, as a result of which the positive connection between the locking lever and the teeth of the park gear is disengaged. As already explained above, the locking lever, when the actuation device is adjusted into the locking position, is pivoted about the pivot axis and a positive engagement between the locking lever and the park gear established. When the actuation device is adjusted into the unlocking position, the locking lever can be pivoted back by the spring return arrangement and the positive engagement between the locking lever and the park gear disengaged. Alternatively to this it can be provided that the locking lever is fixed on the locking lever of the actuation device. During the adjusting of the actuation device from the locking position into the unlocking position, the locking lever that is fixed on the locking lever can also be pivoted back and the positive engagement between the locking lever and the park gear disengaged. In this embodiment of the locking lever, a spring return arrangement can be omitted and the overall construction of the parking lock advantageously simplified.

In a further development of the parking lock according to the invention it is provided that the guide track on the shifting drum comprises at least one locking region and at least one unlocking region which adjoin one another. When the shifting drum is rotated, the locking lever is then guidable away from the park gear through the locking lever radially to the axis of rotation of the park gear towards the park gear and through the unlocking region radially relative to the axis of rotation of the park gear. As already explained above, the locking lever can comprise at least one guide element which radially engages in the guide track of the shifting drum. When the shifting drum is rotated, the guide element can be guided in the unlocking region and in the locking region of the guide track and the guide unit can also be thereby adjusted.

Advantageously, the locking region of the guide track can be arranged on a lateral surface of the shifting drum nearer to the axis of rotation of the park gear than the unlocking region of the guide track. In this way, the at least one guide element of the locking lever and the locking lever itself can be guided in the locking region nearer to the park gear and the actuation device thereby be adjusted into the locking position. When the locking lever directly interacts with the park gear, the locking lever, in the locking position, can directly engage positively in the teeth of the park gear and lock the park gear. When the locking lever interacts indirectly with the park gear via the locking lever, the locking lever, in the locking position, can pivot or move the locking lever into the teeth of the park gear and thereby bring about the positive engagement of the locking lever with the teeth of the park gear.

Advantageously it can be provided that the shifting drum is rotatable in a single direction of rotation. This can be achieved by the at least one locking region and through the at least one unlocking region of the guide track which merge into one another or adjoin one another and thereby form a quasi endless guide track on the lateral surface of the shifting drum. Thus, when the shifting drum is rotated in a direction of rotation, the locking lever can be alternately transferred from the locking region into the unlocking region and from the unlocking region into the locking region. In particular, the overall construction of the actuation device can thereby be simplified.

In a further development of the actuation device it is provided that the shifting drum has drive teeth formed on the guide track. Here, the shifting drum can be rotated via the drive teeth by an actuation wheel of an actuatorically or hydraulically driven motor of the actuation device. Advantageously, the actuation device can comprise a housing on which the shifting drum is rotatably mounted by at least one bearing of the actuation device. Advantageously it can be provided that the actuation device is formed as an assembly unit and can be inserted and thus mounted in the transmission in an assembly direction. Here, the assembly unit comprises for example the shifting drum, the housing, the at least one bearing for the shifting drum, the locking lever and the motor which are already assembled together. During the assembly, the assembly unit can be inserted in the transmission in a simplified manner The invention also relates to a transmission for a motor vehicle having a parking lock described above. Here, the actuation device of the parking lock is formed as an assembly unit and inserted and thus mounted in the transmission in an assembly direction.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
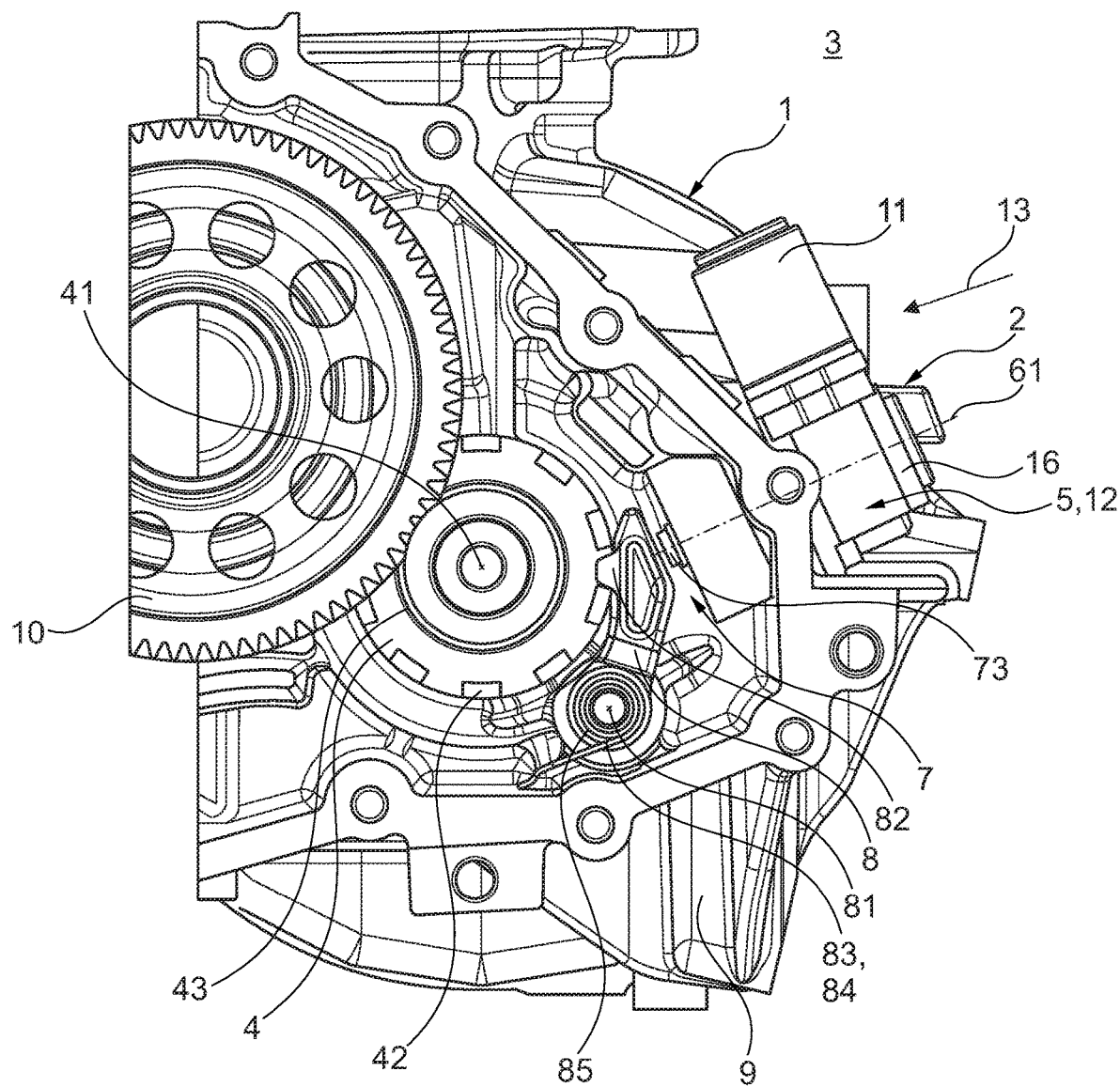
FIG. 1 a view of a transmission according to the invention having a parking lock according to the invention.
Figure 2:
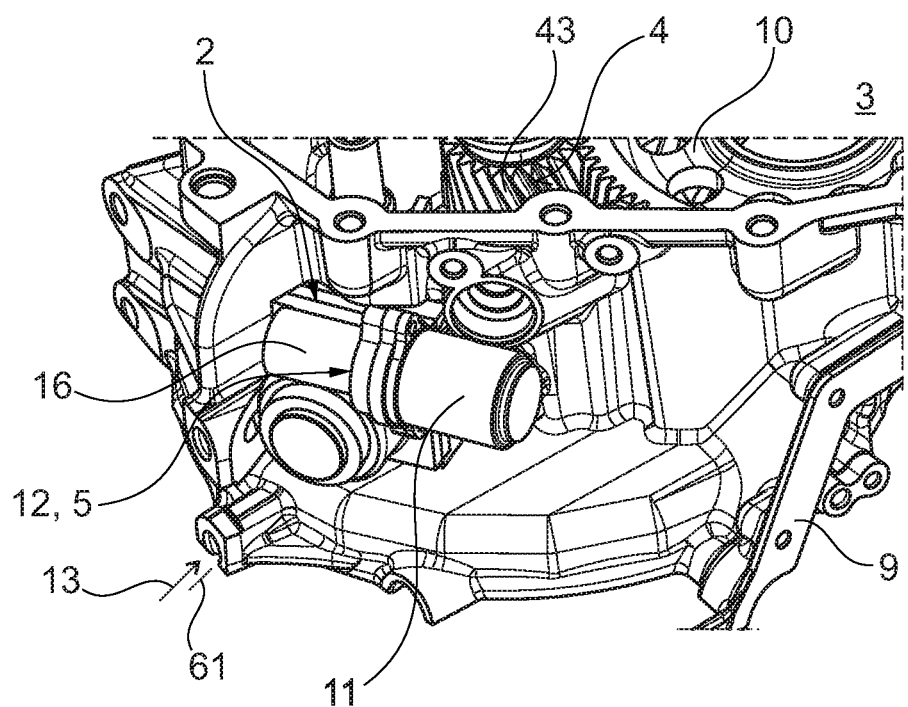
FIG. 2 a further view of the parking lock according to the invention in the transmission according to the invention as per FIG. 1.

FIG. 1 and FIG. 2 show views of a transmission 1 according to the invention having a parking lock 2 according to the invention for a motor vehicle 3. The parking lock 2 comprises a park gear 4 that is rotatable about an axis of rotation 41 and an actuation device 5. Here, the actuation device 5 is adjustable in a locking position—as shown here—and an unlocking position radially relative to the axis of rotation 4a of the park gear 4. To this end, the actuation device 5 comprises a shifting drum 6—see in this respect FIG. 3 and FIG. 4—and a guide unit 7, wherein the shifting drum 6 is rotatable about a guiding axis 61 that is radial relative to the axis of rotation 41 of the park gear 4 by means of a rotary motor 11. The guide unit 7 interacts with the shifting drum 6 in such a manner that when the shifting drum 6 is rotated, the guide unit 7 is guidable relative to the axis of rotation 4a of the park gear 4 and parallel to the guiding axis 6a. In the locking position, the guide unit 7 is guided nearer the axis of rotation 41 of the park gear 4 than in the unlocking position. The guide unit 7 in this embodiment of the parking lock 2 indirectly interacts with the park gear 4 via a locking lever 8. Here, the locking lever 8 is pivotable through the guide unit 7 of the actuation device 5 about a pivot axis 81 that is parallel to the axis of rotation 41 of the park gear 4. To this end, the locking lever 8 is rotatably mounted on an axis section 85.

In the locking position—as shown here—the guide unit 7 is guided radially relative to the axis of rotation 41 towards the park gear 4. Here, the locking lever 8 is pivoted about the pivot axis 81 and positively engages in teeth 42 of the park gear 4 radially to the axis of rotation of the park gear 4. For this purpose, the locking lever 8 comprises a gripping tooth 82 which is integrally formed on the locking lever 8. Through the positive engagement of the locking lever 8 in the teeth 43, the park gear 4 is locked and cannot rotate. Here, the park gear 4 is operatively connected with a gear wheel 10 of the transmission 1 via locking teeth 43, so that in the locking position of the actuation device 5 the gear wheel 10 and thus the transmission 1 are also locked.

In the unlocking position, the guide unit 7 is guided, radially to the axis of rotation 41, away from the park gear 4. Then, the locking lever 8 does not engage in the teeth 42 of the park gear 4 and the park gear 4 is unlocked. Accordingly, the gear wheel 10 of the transmission 1 and the transmission 1 are also unlocked. In order to guide the locking lever 8 away out of the teeth 43 of the park gear 4, the locking lever 8 comprises a spring return arrangement 83 which acts radially relative to the axis of rotation 41 of the park gear 4 against the guide unit 7 of the actuation device 5. Here, the spring return arrangement 83 is formed by a coil spring 84 which is non-rotatably fixed on the axis section 85. The coil spring 84, in the unlocking position of the actuation device 5, pushes the locking lever 8 away from the park gear 4 and disengages the positive connection between the locking lever 8 or the gripping tooth 82 and the teeth 43 of the park gear 4.

The park gear 4 and the locking lever 8 are fixed in a transmission housing 9. The actuation device 5 is arranged, in regions, in a housing 16 and formed as an assembly unit 12. The assembly unit 12 can be inserted into the transmission housing 9 from the outside in an assembly direction 13—which here corresponds to the guiding axis 61. Because of this, the assembly of the parking lock 2 on the transmission 1 can be significantly simplified.

Figure 3:
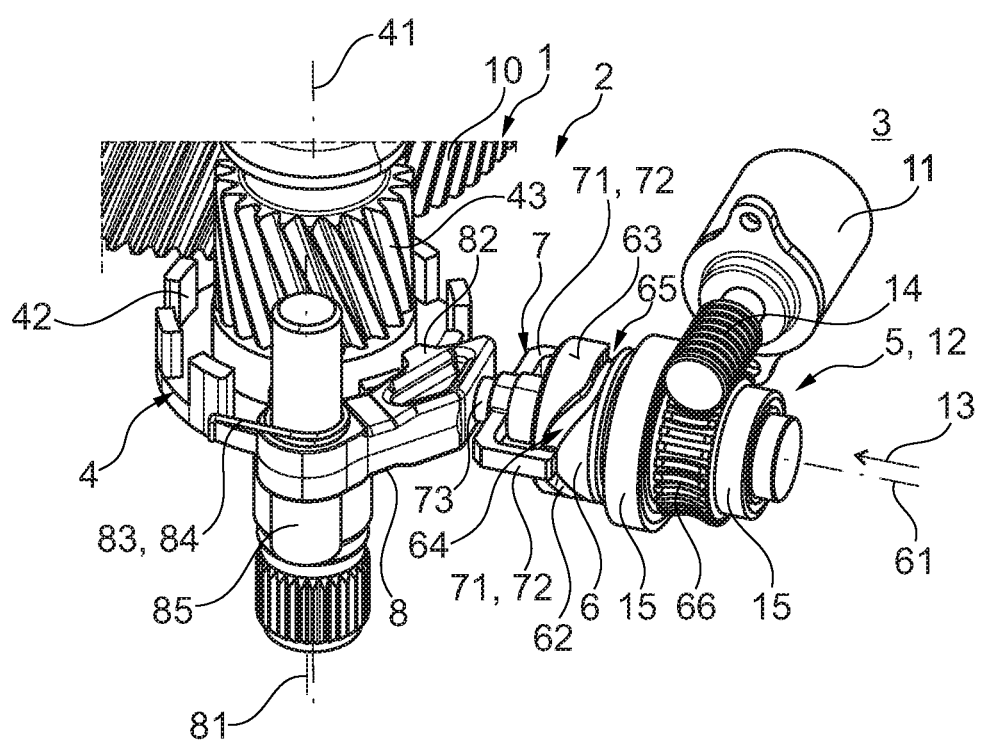
FIG. 3 a view of the parking lock according to the invention as per FIG. 1.
Figure 4:
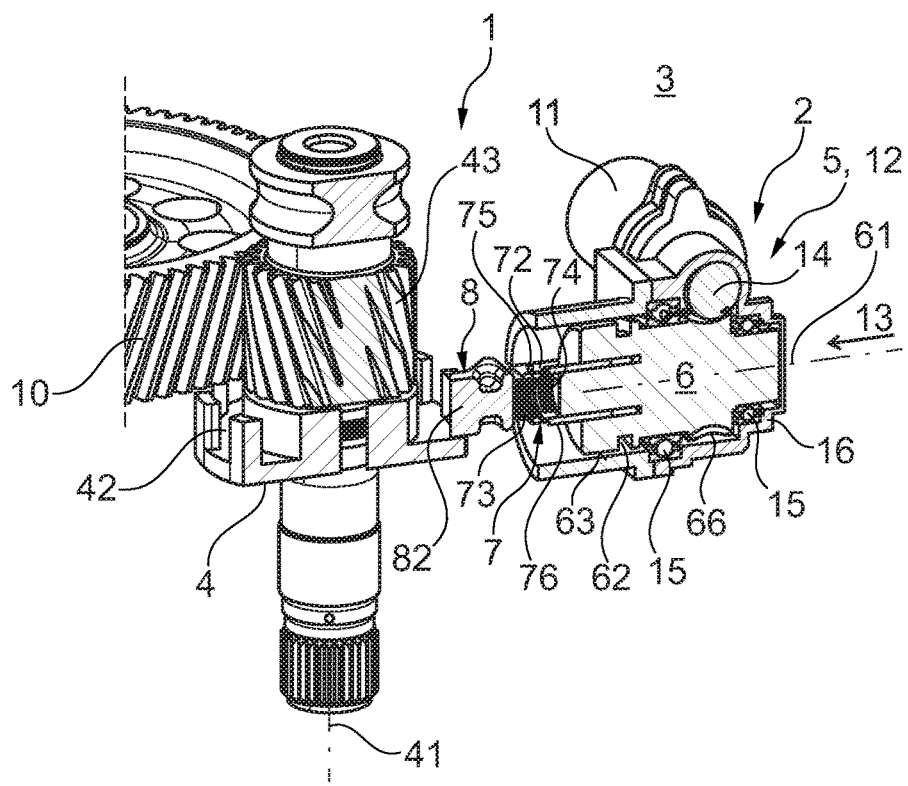
FIG. 4 a sectional view of the parking lock according to the invention as per FIG. 1.
Figure 5:
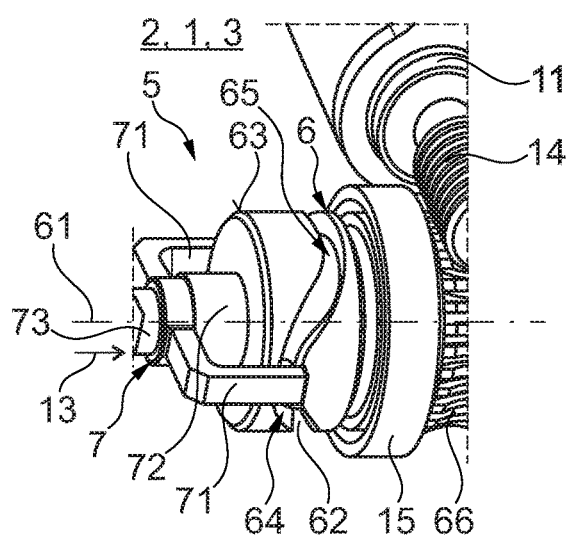
FIG. 5 a part view of an actuation device in the parking lock according to the invention as per FIG. 1.

FIG. 3 shows a view and FIG. 4 shows a section view of the parking lock 2 on the gear wheel 10 of the transmission 1. As already explained above, a rotary movement of the shifting drum 6 is converted in the actuation device 5 into a linear movement of the guide unit 7. To this end, the shifting drum 6 comprises a guide track 62 which is formed on an lateral surface 63 of the shifting drum 6. Here, the guide track 62—as also shown in FIG. 5—comprises two locking regions 64 radially located opposite relative to the guiding axis 61 and two unlocking regions 65 located opposite radially relative to the guiding axis 61, which merge into one another. Here, the guide unit 7 comprises two guide elements 71 located opposite relative to the guiding axis 61 which radially engage in the guide track 62 of the shifting drum 6. Here, the locking region 64 of the guide track 62 is arranged nearer the axis of rotation 41 of the park gear 4 than the unlocking region 65 of the guide track, so that in the locking region 64 the guide unit 7 is guided towards the park gear 4 and in the unlocking region 65 the guide unit 7 is guided away from the park gear 4. When the shifting drum 6 is rotated, the guide elements 71 are guided in the guide track 62 and thereby the guide unit 7 guided parallel to the guiding axis 61 to and from the park gear 4 and the actuation device 5 thereby alternately adjusted into the locking position and into the unlocking position. Advantageously, the shifting drum 6 in this advantageous configuration of the shifting drum 6 can be rotated into a single direction of rotation.

Figure 6:
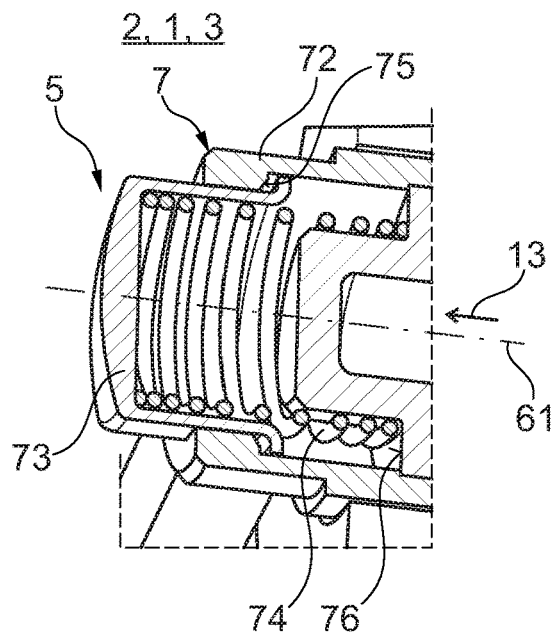
FIG. 6 a part sectional view of the actuation device shown in FIG. 5 in the parking lock according to the invention as per FIG. 1.

In this exemplary embodiment, the guide unit 7 is constructed in two parts and comprises a basic body 72 and a gripping element 73—as also shown in FIG. 6—interacting with the locking lever 8. The two guide elements 71 are integrally formed on the basic body 72 and the gripping element 73 is adjustably mounted by a spring device 74 radially relative to the axis of rotation 41 of the park gear 4 translationally relative to the basic body 72. For this purpose, the gripping element 73 is arranged in the basic body 72 in regions and guidable between two spaced-apart stop faces 75 and 76 radially relative to the axis of rotation 41 of the park gear 4 and parallel to the guiding axis 61 in the basic body 72. Here, the spring device 74 can support itself on the two stop faces. Here, the gripping element 73 is cylindrical and the spring device 74 is arranged about the gripping element 73 in the manner of a coil spring. The shifting drum 6 is driven by the rotary motor 11, preferentially via a spindle drive. For this purpose, the shifting drum 6 comprises drive teeth 66 formed laterally on the guide track 62 and is drive-connected via these with an actuation wheel 14 of the rotary motor 11. On the housing 16 of the actuation device 5, the shifting drum 6 is rotatably mounted by way of two bearings 15.

FIG. 5 shows a part view of the actuation device 5 in the parking lock 2 according to the invention. As already explained above, the shifting drum 6 comprises the guide track 62 with two locking regions 64 and with two unlocking regions 65. The guide elements 71 of the guide unit 7 radially engage in the guide track 62 of the shifting drum 6 so that the guide unit 7 is guidable radially relative to the axis of rotation 41 of the park gear. The locking region 64 of the guide track 62 is arranged nearer the axis of rotation 41 of the park gear 4 than the unlocking region 65 of the guide track 62, so that in the locking region 64 the guide unit 7 is guided towards the park gear 4 and in the unlocking region 65 the guide unit 7 is guided away from the park gear 4. Because of this, the actuation device 5 is also adjustable in the locking position and into the unlocking position.

FIG. 6 shows a part sectional view of the actuation device 5. As already explained above, the guide unit 7 comprises the gripping element 73 interacting with the locking lever 8. The gripping element 73 is arranged in the basic body 72 in regions and mechanically decoupled from the same by the spring device 74. To this end, the gripping element 73 is guidable in the basic body 72 between the stop faces 75 and 76 radially to the axis of rotation 41 of the park gear 4 and resiliently mounted on the basic body 72 by the spring device 74.

The invention claimed is:

1. A parking lock for a transmission of a motor vehicle, comprising:
   a park gear rotatable about an axis of rotation; and
   an actuation device adjustable into a locking position and an unlocking position radially relative to the axis of rotation of the park gear;
   wherein, in the unlocking position of the actuation device, rotating of the park gear is possible, and in the locking position of the actuation device, rotating of the park gear is prevented by way of positive locking;
   wherein the actuation device comprises a shifting drum and a locking lever, wherein the shifting drum is rotatable about a guiding axis that is radial relative to the axis of rotation of the park gear;
   wherein the locking lever, by way of a guide track formed in the shifting drum, interacts with the guide track so that when the shifting drum is rotated, the locking lever is guidable by the guide track radially relative to the axis of rotation of the park gear and parallel to the guiding axis and thereby the actuation device is adjustable into the locking position and into the unlocking position; and
   wherein the shifting drum is rotatable in a single direction of rotation.

2. The parking lock according to claim 1, wherein the locking lever directly interacts with the park gear, so that the actuation device in the unlocking position does not positively engage in teeth of the park gear, and in the locking position the actuation device positively engages in the teeth of the park gear radially relative to the axis of rotation of the park gear.

3. The parking lock according to claim 1, wherein the locking lever of the actuation device indirectly interacts with the park gear via a locking lever of the parking lock, which is pivotable by the locking lever of the actuation device about a pivot axis that is parallel to the axis of rotation of the park gear, so that in the unlocking position of the actuation device the locking lever does not positively engage in teeth of the park gear, and in the locking position of the actuation device, the locking lever of the parking lock positively engages in the teeth of the park gear radially relative to the axis of rotation of the park gear.

4. The parking lock according to claim 3, wherein the locking lever of the actuation device comprises a basic body that is guidable in the guide track and a gripping element, wherein the gripping element interacts with the locking lever of the parking lock and is mechanically decoupled from the basic body radially relative to the axis of rotation of the park gear by a spring device.

5. The parking lock according to claim 3, wherein the locking lever of the parking lock comprises a spring return arrangement which acts radially relative to the axis of rotation of the park gear against the locking lever of the actuation device so that in the unlocking position of the actuation device, the spring return arrangement pushes the locking lever of the parking lock away from the park gear to disengage a positive connection between the locking lever of the parking lock and the teeth of the park gear radially relative to the axis of rotation.

6. The parking lock according to claim 3, wherein the locking lever of the parking lock is fixed on the locking lever of the actuation device.

7. The parking lock according to claim 1, wherein:
   the guide track on the shifting drum comprises at least one locking region and at least one unlocking region, which adjoin one another; and
   wherein when the shifting drum is rotated, the locking lever of the actuation device is guidable through the locking region radially relative to the axis of rotation of the park gear towards the park gear and by the unlocking region, radially away from the park gear radially relative to the axis of rotation of the park gear.

8. The parking lock according to claim 7, wherein the locking region of the guide track is arranged on a lateral surface of the shifting drum nearer to the axis of rotation of the park gear than the unlocking region of the guide track.

9. The parking lock according to claim 1, wherein the shifting drum comprises drive teeth formed laterally to the guide track, wherein the shifting drum is rotatable via the drive teeth by an actuation wheel of an actuatorically or hydraulically driven motor of the actuation device.

10. The parking lock according to claim 1, wherein the actuation device comprises a housing, on which the shifting drum is rotatably mounted by at least one bearing of the actuation device (5).

11. The parking lock according to claim 1, wherein the actuation device is formed as an assembly unit and insertable into the transmission in an assembly direction and mountable.

12. A transmission for a motor vehicle comprising a parking lock having:
   a park gear rotatable about an axis of rotation; and
   an actuation device adjustable into a locking position and an unlocking position radially relative to the axis of rotation of the park gear;
   wherein, in the unlocking position of the actuation device, rotating of the park gear is possible, and in the locking position of the actuation device, rotating of the park gear is prevented by way of positive locking;
   wherein the actuation device comprises a shifting drum and a locking lever, wherein the shifting drum is rotatable about a guiding axis that is radial relative to the axis of rotation of the park gear;
   wherein the locking lever, by way of a guide track formed in the shifting drum, interacts with the guide track so that when the shifting drum is rotated, the locking lever is guidable by the guide track radially relative to the axis of rotation of the park gear and parallel to the guiding axis and thereby the actuation device is adjustable into the locking position and into the unlocking position;
   wherein the actuation device is formed as an assembly unit and is inserted in the transmission in an assembly direction and mounted;
   wherein the guide track on the shifting drum comprises at least one locking region and at least one unlocking region, which adjoin one another;
   wherein when the shifting drum is rotated, the locking lever of the actuation device is guidable through the locking region radially relative to the axis of rotation of the park gear towards the park gear and by the unlocking region, radially away from the park gear radially relative to the axis of rotation of the park gear; and wherein the locking region of the guide track is arranged on a lateral surface of the shifting drum nearer to the axis of rotation of the park gear than the unlocking region of the guide track.

13. The transmission according to claim 12, wherein the locking lever directly interacts with the park gear, so that the actuation device in the unlocking position does not positively engage in teeth of the park gear, and in the locking position the actuation device positively engages in the teeth of the park gear radially relative to the axis of rotation of the park gear.

14. The transmission according to claim 12, wherein the locking lever of the actuation device indirectly interacts with the park gear via a locking lever of the parking lock, which is pivotable by the locking lever of the actuation device about a pivot axis that is parallel to the axis of rotation of the park gear, so that in the unlocking position of the actuation device the locking lever does not positively engage in teeth of the park gear, and in the locking position of the actuation device, the locking lever of the parking lock positively engages in the teeth of the park gear radially relative to the axis of rotation of the park gear.

15. The transmission according to claim 14, wherein the locking lever of the actuation device comprises a basic body that is guidable in the guide track and a gripping element, wherein the gripping element interacts with the locking lever of the parking lock and is mechanically decoupled from the basic body radially relative to the axis of rotation of the park gear by a spring device.

16. The transmission according to claim 14, wherein the locking lever of the parking lock comprises a spring return arrangement which acts radially relative to the axis of rotation of the park gear against the locking lever of the actuation device so that in the unlocking position of the actuation device, the spring return arrangement pushes the locking lever of the parking lock away from the park gear to disengage a positive connection between the locking lever of the parking lock and the teeth of the park gear radially relative to the axis of rotation.

17. The transmission according to claim 14, wherein the locking lever of the parking lock is fixed on the locking lever of the actuation device.

18. A parking lock for a transmission of a motor vehicle, comprising:
a park gear rotatable about an axis of rotation; and
an actuation device adjustable into a locking position and an unlocking position radially relative to the axis of rotation of the park gear;
wherein, in the unlocking position of the actuation device, rotating of the park gear is possible, and in the locking position of the actuation device, rotating of the park gear is prevented by way of positive locking;
wherein the actuation device comprises a shifting drum and a locking lever, wherein the shifting drum is rotatable about a guiding axis that is radial relative to the axis of rotation of the park gear;
wherein the locking lever, by way of a guide track formed in the shifting drum, interacts with the guide track so that when the shifting drum is rotated, the locking lever is guidable by the guide track radially relative to the axis of rotation of the park gear and parallel to the guiding axis and thereby the actuation device is adjustable into the locking position and into the unlocking position; and
wherein the actuation device comprises a housing, on which the shifting drum is rotatably mounted by at least one bearing of the actuation device.

19. A parking lock for a transmission of a motor vehicle, comprising:
a park gear rotatable about an axis of rotation; and
an actuation device adjustable into a locking position and an unlocking position radially relative to the axis of rotation of the park gear;
wherein, in the unlocking position of the actuation device, rotating of the park gear is possible, and in the locking position of the actuation device, rotating of the park gear is prevented by way of positive locking;
wherein the actuation device comprises a shifting drum and a locking lever, wherein the shifting drum is rotatable about a guiding axis that is radial relative to the axis of rotation of the park gear;
wherein the locking lever, by way of a guide track formed in the shifting drum, interacts with the guide track so that when the shifting drum is rotated, the locking lever is guidable by the guide track radially relative to the axis of rotation of the park gear and parallel to the guiding axis and thereby the actuation device is adjustable into the locking position and into the unlocking position;
wherein the locking lever of the actuation device indirectly interacts with the park gear via a locking lever of the parking lock, which is pivotable by the locking lever of the actuation device about a pivot axis that is parallel to the axis of rotation of the park gear, so that in the unlocking position of the actuation device the locking lever does not positively engage in teeth of the park gear, and in the locking position of the actuation device, the locking lever of the parking lock positively engages in the teeth of the park gear radially relative to the axis of rotation of the park gear; and
wherein at least one of:
the locking lever of the actuation device comprises a basic body that is guidable in the guide track and a gripping element, wherein the gripping element interacts with the locking lever of the parking lock and is mechanically decoupled from the basic body radially relative to the axis of rotation of the park gear by a spring device;
wherein the locking lever of the parking lock comprises a spring return arrangement which acts radially relative to the axis of rotation of the park gear against the locking lever of the actuation device so that in the unlocking position of the actuation device, the spring return arrangement pushes the locking lever of the parking lock away from the park gear to disengage a positive connection between the locking lever of the parking lock and the teeth of the park gear radially relative to the axis of rotation; and
wherein the locking lever of the parking lock is fixed on the locking lever of the actuation device.

\* \* \* \* \*